(12) United States Patent
Tiemann

(10) Patent No.: US 7,430,802 B2
(45) Date of Patent: Oct. 7, 2008

(54) LABYRINTH SEAL IN A STATIONARY GAS TURBINE

(75) Inventor: Peter Tiemann, Witten (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/569,144

(22) PCT Filed: Jul. 19, 2004

(86) PCT No.: PCT/EP2004/008052
§ 371 (c)(1),
(2), (4) Date: Feb. 21, 2006

(87) PCT Pub. No.: WO2005/028812
PCT Pub. Date: Mar. 31, 2005

(65) Prior Publication Data
US 2007/0059163 A1 Mar. 15, 2007

(30) Foreign Application Priority Data
Aug. 21, 2003 (EP) .................... 03019002

(51) Int. Cl.
*F01D 11/02* (2006.01)
(52) U.S. Cl. ............... 29/889.22; 415/173.7; 415/174.5
(58) Field of Classification Search ............. 415/168.2, 415/173.7, 174.3, 174.4, 174.5, 183, 187, 415/188, 209.2, 214.1; 416/174, 185, 186 R, 416/193 A; 29/889.22
See application file for complete search history.

(56) References Cited

U.S. PATENT DOCUMENTS

| 2,497,049 | A | * | 2/1950 | Soderberg | .................... 415/194 |
| 2,988,325 | A | | 6/1961 | Dawson | |
| 4,011,718 | A | * | 3/1977 | Asplund | ...................... 60/796 |
| 4,425,079 | A | | 1/1984 | Speak et al. | |
| 5,222,742 | A | | 6/1993 | Roberts | |
| 5,816,776 | A | | 10/1998 | Chambon et al. | |
| 6,050,079 | A | | 4/2000 | Durgin et al. | |

FOREIGN PATENT DOCUMENTS

| DE | 37 12628 A1 | 11/1987 |
| DE | 199 31 765 A1 | 1/2001 |
| FR | 2 241 691 | 3/1975 |
| FR | 2 841 591 A1 | 1/2004 |
| GB | 2 002 460 A | 2/1979 |

\* cited by examiner

*Primary Examiner*—Edward Look
*Assistant Examiner*—Nathaniel Wiehe

(57) ABSTRACT

The invention relates to a segmented inner ring for holding guide blades. According to the invention, a lateral wall opposing the front side of the inner ring and pertaining to a shaft shoulder formed on the rotor shaft extends radially, and respectively one half of a labyrinth seal is formed on the front side of the inner ring and on the shaft shoulder. The aim of the invention is to apply an arrangement of stacked labyrinth seals, known from airplane turbines, to a stationary gas turbine having a separation plane. To this end, a method is used to mount an inner ring of a gas turbine. The invention also relates to a stationary gas turbine comprising a segmented inner ring.

6 Claims, 3 Drawing Sheets

LABYRINTH SEAL IN A STATIONARY GAS TURBINE

CROSS REFERENCE TO RELATED APPLICATIONS

This application is the US National Stage of International Application No. PCT/EP2004/008052, filed Jul. 19, 2004 and claims the benefit thereof. The International Application claims the benefits of European Patent application No. 03019002.9 EP filed Aug. 21, 2003. All of the applications are incorporated by reference herein in their entirety.

FIELD OF THE INVENTION

The invention relates to a stationary gas turbine having a segmented inner ring for holding guide vanes. It also relates to a method for assembling a segmented inner ring for guide vanes of a stationary gas turbine.

BACKGROUND OF THE INVENTION

DE 37 12 628 has disclosed an inner ring for holding guide vanes of a stationary gas turbine. The guide vanes which are arranged in a star shape around the rotor to form a guide vane ring are secured to the housing of the gas turbine by means of their radially outer guide vane roots. The radially extending guide vanes, on their side facing the rotor, have the guide vane head, which is connected to the stationary inner ring. This inner ring, which is U-shaped in cross section, engages coaxially around the rotor of the gas turbine and connects the guide vanes of a guide vane ring to one another in order to increase the stability of the guide vane ring and to improve the vibrational properties of the guide vanes. A gap is in this case formed between the web of the U-shaped inner ring, its flanks and the corresponding circumferential and end faces associated with the rotor. Likewise, the web of the U-shaped inner ring, on its surface facing the rotor, has one half of a labyrinth seal, which together with the second half arranged on the rotor forms the labyrinth seal.

When the gas turbine is operating, the working fluid which flows within the flow passage is only supposed to flow past the guide vanes of a guide vane ring. However, the working fluid can also flow through the gap formed by stationary and rotating components, as a leakage flow.

To reduce the extent of the leakage flow, the gap between the stationary and rotating components is sealed by means of the labyrinth seal.

Furthermore, it is known to provide a plurality of labyrinth seals in the gap between the flank of the inner ring and of the shaft shoulder, in order to achieve an improved sealing action. In this case, two labyrinth seals are arranged axially and radially offset with respect to one another, in a terraced arrangement, in the gap between the flank and shaft shoulder.

The terraced arrangement of a plurality of labyrinth seals takes up a large amount of space and is only used for stationary gas turbines. Stationary gas turbines have a parting plane located between a lower housing half and an upper housing half and are fitted together radially during assembly. In the process, the finished rotor is inserted into the lower housing half, which has already been preassembled and onto which the upper housing half is then fitted, so that only labyrinth seals which are offset in terraced fashion with respect to one another are possible between the rotor and the housing.

U.S. Pat. No. 5,222,742 has disclosed a stacked labyrinth seal between the securing ring for the guide vane of a turbine and a rotor blade mounted on the rotor of the turbine. The turbine is an axially assembled aircraft turbine, i.e. the axially successive rotor blade rings and guide vane rings of the individual compressor stages and/or turbine stages are mounted in succession ring by ring, so that a stacked arrangement is possible. Further labyrinth seals which have been stacked in this way for aircraft turbines are known from DE 199 31 765 and FR 2 241 691.

Since stacked labyrinth seals have hitherto only been known for aircraft turbines, a person skilled in the art was not hitherto in a position to transfer stacked labyrinth seals to stationary gas turbines, on account of the axial method of assembly.

SUMMARY OF THE INVENTION

Therefore, the object of the invention is to design a stationary gas turbine with a parting gap in such a way that the leakage flow is reduced by means of the stacked arrangement of labyrinth seals which is known from aircraft turbines. A further object is to provide a method for assembling an inner ring which allows a stacked arrangement of labyrinth seals.

The object relating to the gas turbine is achieved by the features herein disclosed. The object relating to the method is also achieved by the features herein disclosed. Advantageous configurations are given in this specification.

By carrying out the working steps of the invention, it is now possible for the first time for the arrangement of stacked labyrinth seals which is known from aircraft turbines also to be transferred to stationary gas turbines. It is therefore possible for a plurality of labyrinth seals which are stacked radially on top of one another to be arranged in a stationary gas turbine with a parting plane, and for the improved sealing action which ensues to be utilized for a stationary gas turbine. The leakage flow which reduces the efficiency of the stationary gas turbine is considerably reduced as a result.

The space required for the radially stacked labyrinth seals is reduced compared to the terraced arrangement. In particular, the size of the seal and of the entire inner ring in the axial direction have been reduced.

A gas turbine of this type is dismantled by carrying out the working steps of the invention in the reverse order.

If each labyrinth seal has a first coaxial balcony on the end side of the inner ring and a further coaxial balcony on the shaft shoulder, which balconies each, project in the axial direction, it is possible for the two balconies, in the assembled state of the inner ring, to lie radially opposite one another. This stacked arrangement of the balconies allows the series connection of labyrinth seals and forms a meandering gap for the leakage flow.

The labyrinth seal is advantageously formed by a sealing surface and at least one sealing tooth, the first balcony having the coaxial sealing surface, which faces the further balcony, and the further balcony, on its circumferential surface which faces the first balcony, having at least one circumferential sealing tooth which extends toward the sealing surface.

For axial securing purposes, the inner ring can be fixed to the rotationally fixed modules and/or to the guide vanes.

If the inner ring is arranged between two rotor blade rings, it can be secured against axial displacement by means of a securing ring. In this case, the securing ring is segmented and is mounted on the guide vane.

It is expedient for the securing ring to be arranged upstream of the inner ring.

It is advantageous for the sealing surfaces and the sealing teeth provided on the balconies to be designed in such a manner that intended axial displacement of the rotor counter to the direction of flow of the working fluid is possible without any change in the sealing action. Consequently, while the gas turbine is operating the rotor can be displaced without any deterioration in the sealing action. This is important in particular if the gap between the rotor blade tip and the radially outer, conical inner wall of the hot gas duct is to be reduced in size by the displacement of the rotor.

BRIEF DESCRIPTION OF THE DRAWINGS

The invention is explained with reference to a drawing, in which.

DETAILED DESCRIPTION OF THE INVENTION

Figure 3:
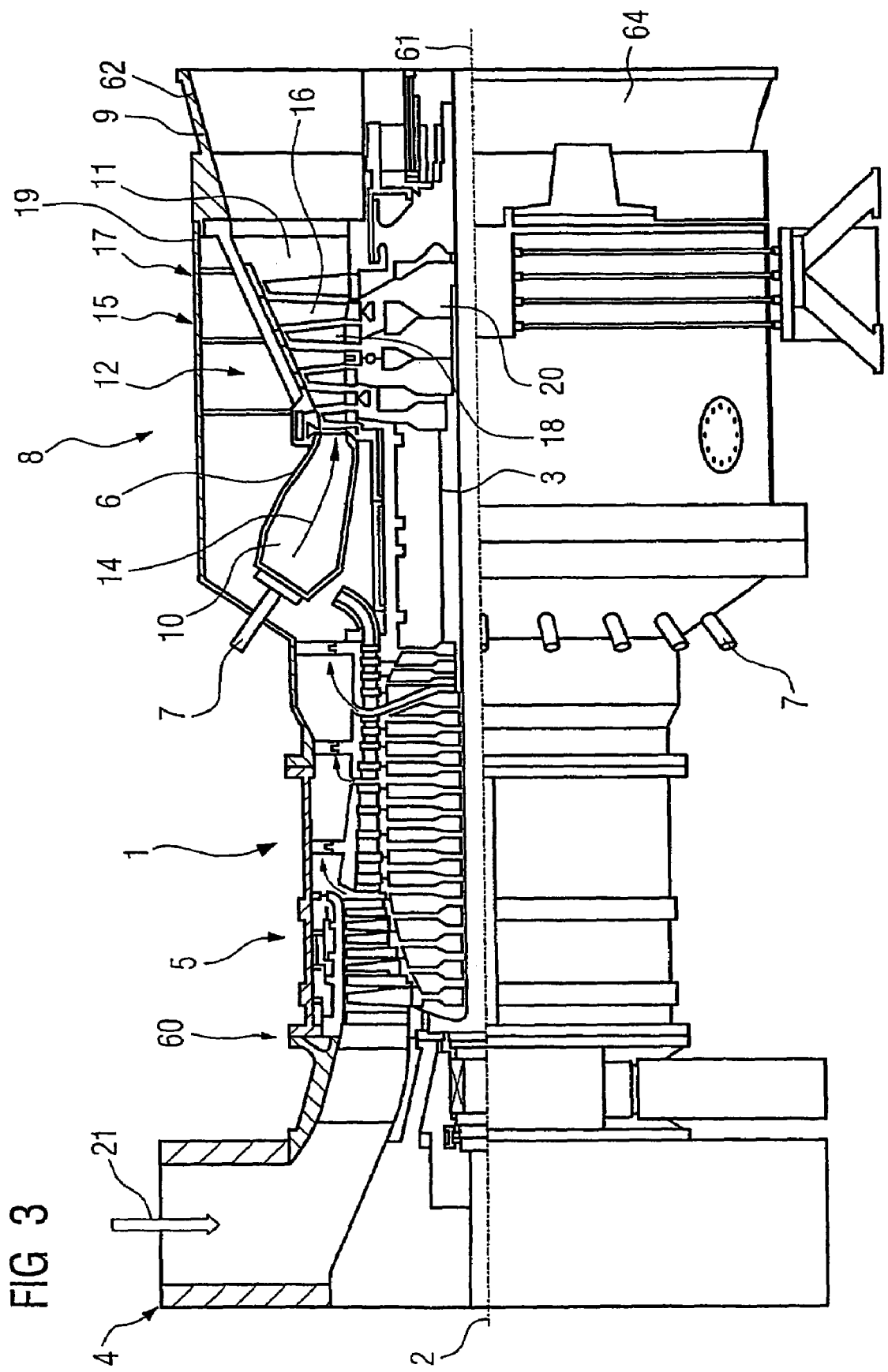
FIG. 3 shows a partial longitudinal section through a gas turbine.

FIG. 3 shows a stationary gas turbine 1 in the form of a partial longitudinal, section. In its interior, it has a rotor 3, which is mounted such that it can rotate about an axis of rotation 2 and is also referred to as the turbine rotor or rotor shaft. An intake housing 4, a compressor 5, a toroidal annular combustion chamber 6 with a plurality of coaxially arranged burners 7, a turbine 8 and the exhaust-gas housing 9 follow one another along the rotor 3. The annular combustion chamber 6 in this case forms a combustion space 10 which is in communication with an annular hot-gas duct 11, where four turbine stages 12 connected in series form the turbine 8. Each turbine stage 12 is formed from two blade/vane rings. As seen in the direction of flow of a working fluid 14, a guide vane ring 17 is followed in the hot-gas duct 11 by a ring 15 formed from rotor blades 18. The guide vanes 16 are secured to the stator 19, whereas the rotor blades 18 of a ring 15 are secured to the rotor 3 by means of a turbine disk 20. A generator (not shown) is coupled to the rotor 3.

The stationary gas turbine 1 has a housing 60 which with respect to a parting plane 61 running parallel to the horizontal plane can be divided into an upper housing half 62 and a lower housing half 64. In the subsequent text using the terms "upward" and "downward" or "upper half of the . . . " and "lower half of the . . . ", this is in each case to be understood as meaning with respect to the parting plane 61 of the gas turbine 1 for the object in question.

While the gas turbine 1 is operating, the compressor 5 sucks in air 21 through the intake housing 4 and compresses it. The air 21 provided at the turbine end of the compressor 5 is fed to the burners 7, where it is mixed with a fuel. The mixture is then burnt so as to form the working fluid 14 in the combustion space 10. From there, the working fluid 10 flows past the guide vanes 16 and the rotor blades 18 in the hot-gas duct 11. The working fluid 14 expands at the rotor blades 18, transmitting its momentum as it does so, so that the rotor 3 is driven, and with it the generator coupled to it is also driven.

On their side facing the housing 13, the guide vanes 16 have a guide vane root, by means of which they are hooked in an annular guide vane carrier. At their end facing the rotor 3, i.e. the guide vane head, they are connected to an inner ring 30.

Figure 1:
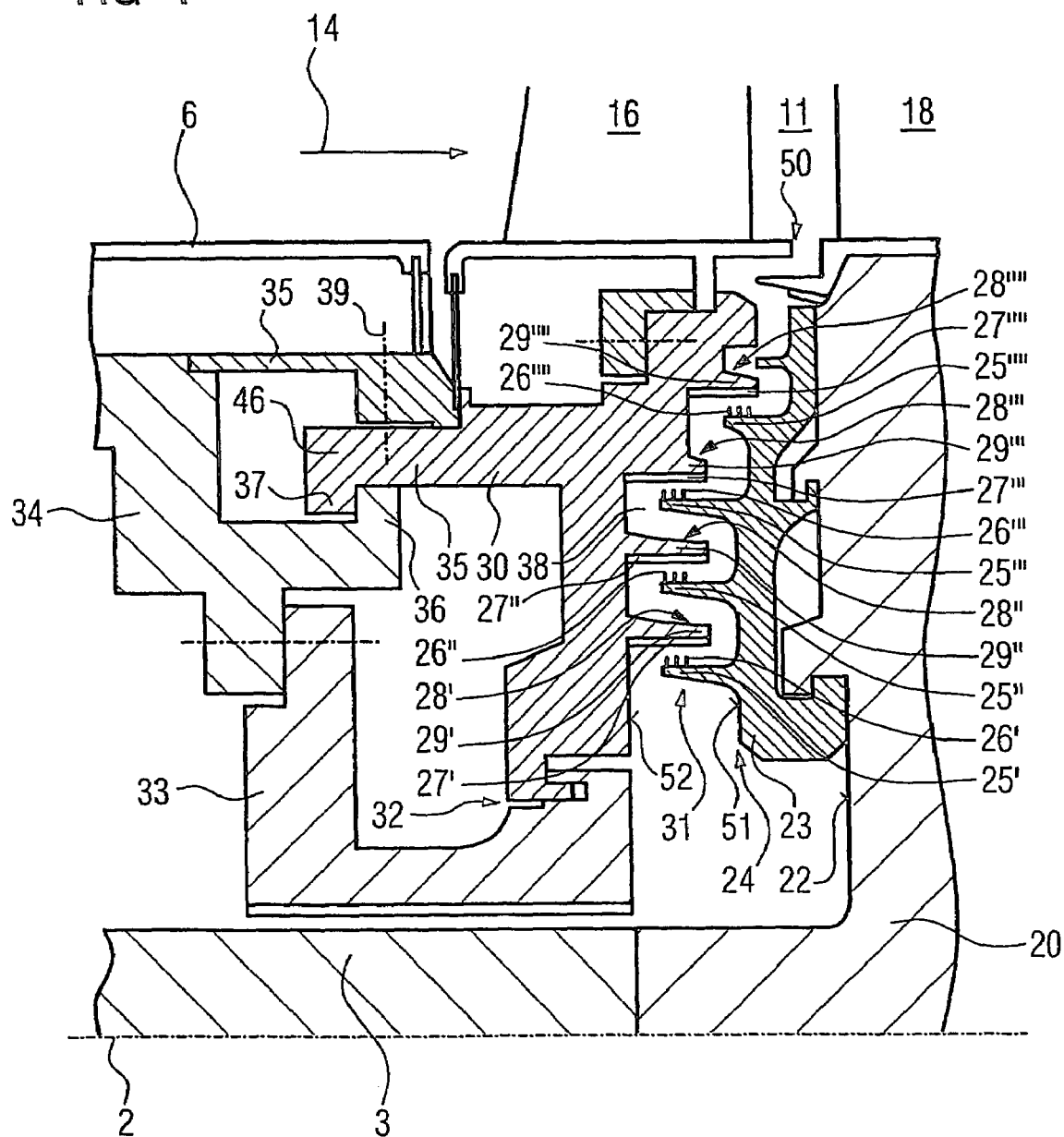
FIG. 1 shows a segmented securing ring for guide vanes of a first turbine stage.

FIG. 1 shows an excerpt from the gas turbine 1 between the guide vane 16 of the first turbine stage 12 and the rotor 3. The inner wall, located on the radially inner side, of the combustion chamber 6 delimits the hot-gas duct 11 toward the inside. As seen in the direction of flow of the working fluid 14, the guide vane 16 of the first turbine stage 12 is followed by the rotor blade 18.

On the rotor 3 is the turbine disk 20, which at its outer circumference holds the rotor blades 18. To secure the rotor blades 18 against axial displacement, at a side wall 22 of the turbine disk 20 a covering element 23 is hooked to the turbine disk 20 by means of a plurality of radially spaced hooks. The covering element 23, together with the turbine disk 20, forms a shaft shoulder 24.

A plurality of balconies 25' 25", 25''', 25'''', which extend in the axial direction and are coaxially encircling, are arranged on a side wall 51, facing the combustion chamber 6, of the covering element 23.

In each case three sealing teeth 26', 26", 26''', 26'''' extend coaxially on that circumferential surface of each balcony 25 which faces away from the rotor 3.

Three modules 33, 34, 35 are mounted rotationally fixedly on the stator 19, between the inner wall, located on the radially inner side, of the combustion chamber 6 and the rotor 3. The rotationally fixed inner ring 30 is provided between the modules 33, 34, 35 and the covering element 23.

On its end side 52 facing the shaft shoulder 24, the inner ring 30 has a plurality of balconies 29', 29", 29''', 29'''' extending in the axial direction and coaxially encircling. Sealing surfaces 27', 27", 27''', 27'''' are in each case provided on those circumferential surfaces of the balconies 29 which face the sealing teeth 26. Each sealing surface 27, together with its corresponding sealing teeth 26, forms a labyrinth seal 28.

A meandering gap 38, in which therefore four labyrinth seals 28', 28", 28''', 28'''' are connected sequentially, of which the three labyrinth seals 28', 28", 28''' are stacked radially on top of one another, is formed between the covering element 23 and the inner ring 30.

The labyrinth seal 28'''' is not stacked radially with respect to the next labyrinth seal 28''' radially inward, but rather is arranged in terraced fashion, i.e. the labyrinth seal 28'''' is axially offset with respect to the labyrinth seal 28'''.

At its end side 52 facing the combustion chamber 6, the inner ring 30 has an axially extending arm 46, on the free end of which a projection 37, which extends radially inwards, is formed integrally.

On its side facing the inner ring 30, the module 34 comprises a projection 36, which forms a hooked engagement with the projection 37 of the inner ring 30.

When the gas turbine 1 is operating, a working fluid 14 flows within the hot-gas duct 11. To prevent the working fluid 14 from penetrating as a leakage flow into a gap 38 formed by stationary and rotating components, the gap 38 has a plurality of labyrinth seals 28 which are stacked radially on top of one another and act jointly, in terms of flow, as a seal 31.

The three labyrinth seals 28', 28", 28''', which are stacked without any axial offset with respect to one another, allow a more compact design combined, at the same time, with an improvement in the sealing action as a result of the increase in the number of labyrinth seals 28.

Figure 2:
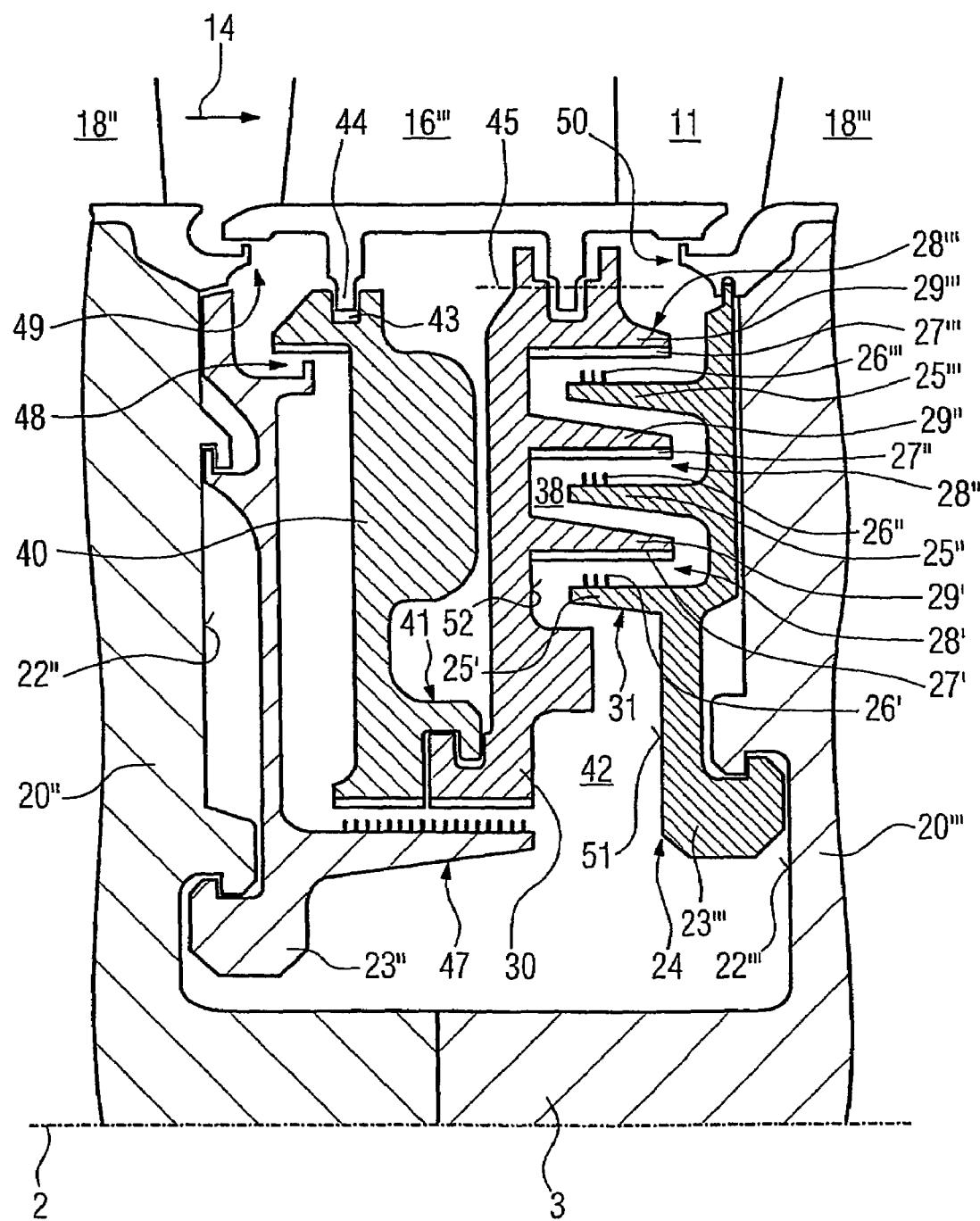
FIG. 2 shows the segmented inner ring for the guide vanes of a second, third and fourth turbine stage.

FIG. 2 shows an excerpt of a gas turbine 1 located between the hot-gas duct 11 and the axis of rotation 2 of the rotor 3. The turbine disk 20" bears the rotor blade 18" of the second turbine stage and the turbine disk 20''' bears the rotor blade 18''' of the third turbine stage. On the side wall 22" of the turbine disk 20", the covering element 23" secures the rotor blade 18" against axial displacement. The covering element 23" is hooked to the turbine disk 20" by means of two hooked engagements that are radially spaced apart from one another. In the same way, the covering element 23'" secures the rotor blade 18'" against axial displacement. In this case, the covering element 23'" and the turbine disk 20'" are hooked together on the side wall 22'".

The inner ring 30 with a securing ring 40 is provided in the groove-shaped recess 42 formed between the two turbine disks 20", 20'". The securing ring 40 is connected to the inner ring 30 on its side facing the rotor 3 by means of a hooked engagement 41 and is connected to the guide vane 16'" on its side facing away from the rotor 3. For this purpose, the inner ring 30 is bolted to the guide vane 16'" by means of a bolt 45, whereas the securing ring 40 is clamped to the guide vane 16'". The securing ring 40 has a groove 43 into which extends a projection 44 arranged on the guide vane 16'".

The side wall 51 facing away from the turbine disk 20'", the covering element 23'" has three balconies 25', 25", 25'" which extend in the axial direction and are coaxially encircling. In each case three coaxially encircling sealing teeth 26', 26", 26'" are provided on the outer circumference of the individual balconies 25', 25", 25'". On its end side 52 assigned to the turbine disk 20'", the inner ring 30 likewise has three balconies 29', 29", 29'", which extend in the direction of the shaft shoulder 24 and are coaxially encircling transversely with respect thereto. Each balcony 29, on its inner circumferential surface, has a sealing surface 27 facing the balconies 25 of the covering element 23'" located further inward in the radial direction. In this case, the sealing surface 27' together with the sealing tooth 26' forms a labyrinth seal 28', the sealing surface 27" together with the sealing tooth 26" forms a further labyrinth seal 28", and the sealing surface 27'" together with the sealing tooth 26'" forms the third labyrinth seal 28'".

The seal 31 shown in FIG. 2 can be put together by the sequence of the following assembly steps:

At the start of assembly of the stationary gas turbine 1 having the parting plane 61, first of all the lower housing half 64 is put in place. In each case the lower halves of the guide vane rings 17 have already been completed in the lower housing half 64 by means of preassembled guide vanes 16.

Only the covering element 23" has been mounted on the rotor 3, which has not yet been fitted; the side wall 22'" does not yet have a covering element 23'".

For each inner ring 30 according to the invention, the lower half of the securing ring 40, which is formed by a single-part or multi-part segment of a total size of 180°, is placed into the lower housing half 64, so that the projection 44 engages in the groove 43. Then, the lower half of the inner ring 30 is mounted in the lower housing half 64 which in each case hooks to the inner ring 30 and is partly bolted to the guide vanes 16 in order to secure them against relative movements. The lower half of the securing ring 30 is likewise formed from one or more segments totaling a size of 180°.

When the lower half of each securing ring 40 and inner ring 30 has been mounted in the lower housing half 64, the rotor 3 is placed into the lower housing half 64. At least the lower halves of the side wall 22'" of the turbine disks 20, which subsequently face the end side 52, must not have a covering element 23'", since otherwise the rotor 3 cannot be placed into the lower housing half 64.

A segment of the covering element 23'" is mounted on the upper half of the side wall 22'" of the rotor 3 which has already been placed into the lower housing half 64.

Then, the rotor 3 is rotated, so that during this rotation the segment of the covering element 23'" which is mounted on the upper half is rotated into the lower housing half 64. In the process, the axially extending balconies 25 of the covering element 23'" move accurately between the corresponding balconies 29 of the inner ring 30 which is already located in the lower half.

Segments of covering elements 23 continue to be mounted on the upper half of the side walls 22 and rotated into the lower housing half 64 until the lower half of the seal 31 has been completely formed.

After the upper half of the covering element 23 has then been mounted on the upper half of the rotor 3 on the side wall 22'", the upper half of the inner ring 30 can then be moved radially inward into the recess 42 formed between the turbine disks 20", 20'" in order to complete the inner ring 30, in order for the balconies 29 thereof then to be moved over the balconies 25 of the covering elements 23'" by displacement in the axial direction. The upper half of the inner ring 30 is positioned on the flanges of the lower half of the inner ring 30 or securing ring 40.

Thereafter, the upper half of the securing ring 40 is moved into the recess 42 and hooked to the inner ring 30 in order to complete the circular, segmented securing ring 40.

Then, in a manner which is already known, the guide vanes 16 of the upper half of the guide vane ring 17 can be mounted.

The assembly instructions are carried out in a similar manner for securing the guide vanes 16 of the first turbine stage 12 shown in FIG. 1.

In the lower housing half 64, the guide vanes 16 and the modules 35, 36, 37 have already been preassembled before the rotor 3 without covering element 23 is placed into it.

Then, if not already present, one or more segments of the covering element 23 are mounted on the upper half of the side wall 22 of the first turbine disk 20. Next, the rotor 3 is rotated, so that the segment(s) slide into the lower housing half 64 so as to form the lower half of the seal 31.

After the upper half of the covering element 23 has been mounted on the upper half of the rotor 3 at the side wall 22, the upper half of the inner ring 30 can then be moved radially inward into the clear space between turbine disk 20 and annular combustion chamber 6, in order for the balconies 29 thereof then to be pushed in the axial direction over the balconies 25 of the covering elements 23. The upper half of the inner ring 30 is located on the end sides of the lower half of the inner ring 30. Then, the modules 33, 34 and 36 are successively installed.

In an alternative configuration, each segment can be formed from a plurality of pieces.

During operation, it is possible for the rotor 3 to be displaced counter to the direction of flow of the working fluid 14 without a balcony 25, 29 touching or striking the end side lying opposite it.

The inner ring 30, which is rotationally fixed while the gas turbine 1 is operating, together with the rotating covering elements 23, forms a gap 38 which is sealed by means of the seal 31. The working fluid 14 is effectively prevented from leaving the hot-gas duct 11, so that it flows past the rotor blades 18 as intended. The leakage flow is effectively reduced, which leads to an increase in the efficiency of the stationary gas turbine.

Furthermore, the seals 47, 48, 49, 50 reduce the leakage flow between rotating and stationary components.

The invention claimed is:

1. A method of assembling a segmented inner ring within a stationary gas turbine, comprising:
   a) mounting a guide vane segment to the turbine;
   b) mounting a securing ring to the vane segment;
   c) mounting an inner ring to the inner diameter of the vane segment, the inner ring having an end face;

d) placing a rotor into the turbine, the rotor having an upper side wall;

e) mounting a segment of an annular covering element to the rotor upper side wall, the annular covering element having a plurality of balconies arranged toward the inner ring end face;

f) rotating the rotor to rotate the mounted covering element into the inner ring;

g) repeating steps e) and f) such that the inner ring and covering elements form a lower portion of a labyrinth seal;

h) mounting additional covering element segments on the rotor upper side wall to completely form the annular covering element ring;

i) moving at least one segment of the inner ring radially inward and axially toward the covering element to completely form the inner ring and thereby completely form the seal; and j) moving a securing ring segment radially inward to engage a remaining void in the inner ring to completely form the securing ring.

2. The method as claimed in claim 1, wherein the method steps a) to j) are performed in reverse order to dismantle the inner ring.

3. The method as claimed in claim 1, wherein a plurality of guide vane segments are mounted to a housing of the turbine.

4. The method as claimed in claim 3, wherein a lower half of the securing ring is mounted to an inner diameter of the vane segments.

5. The method as claimed in claim 4, wherein a lower half of an inner ring is mounted to the inner diameter of the vane segments.

6. The method as claimed in claim 1, wherein the rotor is rotated an amount equal to the arc length of the mounted covering element segment.

* * * * *